Patented Nov. 16, 1937

2,099,297

UNITED STATES PATENT OFFICE 2,099,297

PHOTOGRAPHIC MATERIAL AND PROCESS

Louis Etienne Clément, Meudon-Val-Fleury, France, assignor, by mesne assignments, to Eastman Kodak Company, Jersey City, N. J., a corporation of New Jersey No Drawing. Application June 23, 1936, Serial No. 86,775. In France June 24, 1935

2 Claims. (Cl. 95—6)

The present invention relates to photography and particularly to a method for obtaining images, figures, drawings, etc., by direct registering or by copying negatives, tracings, masks, stencils, etc., either by contact or by projection.

Another object of the invention is to provide a light sensitive material comprising a light sensitive substance adapted to set a halogen free by the effect of light and a receptive substance which is adapted to become coloured, or to be decolorized, or to change its color by a combination with the said halogen, or by the adsorption of this latter.

The light sensitive substance adapted to set a halogen free may be a halogen substituted hydrocarbon, such as iodoform, bromoform, or more complex derivates, such as tetraiodopyrol and diiodoform.

The receptive substance submitted to the action of the halogen set free may consist of ordinary or water soluble starch, agar-agar, or any colloid or colouring matter or dye or other substance adapted to be acted upon by a halogen. Said receptive substance may be a polyvinyl compound, and particularly polyvinyl acetate, polyvinyl chloracetate and polyvinyl chloride, which give with iodine an intense red-brown colour, or polyvinyl alcohol, the polyvinyl formals and acetals and the other condensation products obtained from polyvinyl alcohol and an organic coupler, which give with iodine intense colours which proceed generally from blue to violet, and which may proceed even to black.

The sensitive and receptive substances may be incorporated wholly or partially in an excipient, such as a colloid, for example a cellulose derivative, a natural or synthetic resin, a gum, a siccative oil, and other substances adapted to further the chemical action may be added, such as catalysts or sensitizers.

The polyvinyl compound may be dissolved or dispersed in a suitable solvent or diluting substance, or in a suitable coating substance, which may itself contain the halogenated light sensitive compound (such as iodoform). It will be remembered in this connection that polyvinyl alcohol is soluble only in water, and that the other vinyl compounds are generally soluble in halogenated hydrocarbons, such as methylene or ethylene chloride, or tetrachlorethane, with or without alcohol, and certain organic solvents which are common to the cellulose derivatives. However, the solubility varies from one class of products to the other, and also between the products of the same class, according to the properties of the original substance and the conditions of preparation.

In the case of polyvinyl alcohol, this substance is dispersed in the state of fine powder in a coating substance which is insoluble in water, in order to prevent it from being dissolved in the developing bath, which usually contains water. But if use is made of one of the other vinyl compounds above mentioned, it is possible, according to the case, to disperse it in the state of fine powder in the solvent used to dissolve the other ingredients, or to select, among the solvents of the polyvinyl compound, the solvent in which the other ingredients are soluble (such as iodoform, excipient, plasticizer, catalyst, etc.).

The solution, the dispersion, or the coating thus obtained, may be applied by any suitable means to any base.

By reason of the chemical, physical and mechanical properties of the polyvinyl compounds, these may act at the same time as receptive substances, excipients, vehicles for other ingredients, and as a base for the film or sheet, which film or sheet may thus be limited to a single layer which is self-supporting and contains all the ingredients.

The photographic product having one or more layers which is thus obtained may be exposed to light in any way, and for instance under a negative. The resulting image is then developed, for instance in water or steam or in alcohol or a mixture of water and alcohol, or water containing a basic substance, such as ammonia, and is then fixed and dried.

The fixing may be effected by washing with a solvent of the halogenated compound, for instance with petrol, white spirit, etc., which dissolves the undecomposed iodoform, but will not dissolve the polyvinyl compound, or the coating or base with which it may eventually be incorporated.

The presence, either in the light sensitive layers or in the developing bath, of minute quantities of a metallic iodide (such as iodide of potassium or cadmium) will further the reaction.

Although it may serve at the same time as an excipient, the polyvinyl compound which forms the receptive substance might be mixed, as such, with other excipients such as derivatives of cellulose, natural or synthetic resins, gums, oils, etc., with which it is compatible, and use might also be made of mixtures of various polyvinyl compounds which are sensitive to the action of the halogen, in order to obtain different colours.

It is possible to incorporate into the light sensitive layers suitable catalysts, sensitizers, plasticizers, etc.

The following examples illustrate the process according to the invention.

*Example I.*—Polyvinyl alcohol.

A varnish is prepared having the following composition:

| | |
|---|---|
| Nitrocellulose with 25% alcohol (viscosity in acetone at 2%:100" Engler) 40 grammes counted dry, or | 54 gr. |
| Butyl acetate | 200 c. c. |
| Butyl alcohol | 100 c. c. |
| Acetic ester | 200 c. c. |
| Crystallizable benzine | 500 c. c. |

In this varnish 100 gr. of polyvinyl alcohol are ground up and then the varnish is sifted. The following substances are added:

| | |
|---|---|
| Iodoform | 7, 5 gr. |
| Triphenylphosphate | 20 gr. |
| Tricresylphosphate | 20 gr. |

From the moment when the halogenated compound has been added, the varnish is to be kept in a dark container or in a dim light.

The varnish may be applied in one or a plurality of layers, by immersion or by the spraying process, on any smooth or granular surface, such as cardboard, paper, wood, metal, fabric, natural or artificial leather, glass, china, ceramics, plaster or any plastic material.

*Example II.*—Divinyl formal.

A varnish is prepared containing:

| | |
|---|---|
| Methylene chloride | 70 parts |
| Alcohol | 20 parts |
| Divinyl formal | 10 parts |

To this varnish is added:

| | |
|---|---|
| Iodoform | 1% |

This varnish can be used in the manner set forth in the first example. Instead of preparing a single varnish containing the polyvinyl compound and the halogenated light sensitive compound, as in the above-mentioned Example II, the divinyl formal, in solution in a suitable solvent, may be applied in a layer upon any suitable base, and this layer can then support itself; the iodoform may be incorporated alone into a cellulose varnish, for instance one having nitrocellulose as a base, which is then applied to the layer of divinyl formal.

This method of proceeding may have an advantage in certain applications, and the varnish containing the iodoform can thus be applied a short time before using; the products containing the divinyl formal may thus be preserved from light until the time of the application of the light sensitive varnish.

On the contrary, for other uses, for instance when it is desired to apply the layer containing the vinyl compound to a cellulose base, some difficulty may be encountered for obtaining a good adhesion. In this case, it will be advantageous to place the iodoform in solution in a cellulose varnish containing a solvent for the base, which varnish constitutes a substratum causing the layer containing the vinyl compound to adhere to the base.

Obviously, these examples are not limitative, and in particular, the one given for the polyvinyl formal and iodoform may be extended to other vinyl compounds and to other halogenated compounds.

The layers containing these polyvinyl compounds will give, after suitable exposure to light, a yellow image which is more or less light, which, after developing by water to which can be added a soluble iodide, turns to a red-brown, a violet-brown, blue, etc. according to the vinyl compound employed.

The duration of the exposure of the light sensitive layer varies with the nature of the luminous source and with the brilliancy of the object or with the density of the negative or drawing to be reproduced. In sun light, said duration may be 5 to 20 minutes. It will be 5 to 20 minutes with a mercury lamp of 500 watts at a distance of 15 centimeters, and 10 to 30 minutes with an incandescent lamp with boosting voltage of 500 watts at the same distance.

The duration of developing is 5 to 6 minutes with water at 40° C., it is longer when the temperature of the water is lower. After suitable drying of the light sensitive layer, the fixing is effected by a number of successive and thorough washing operations by means of petrol, white spirit, or other suitable solvent for the iodoform which has not been decomposed by light.

The excipient may be chosen among the colloids, such as cellulose derivatives, natural or synthetic resins, gums, siccative oils, etc. The excipient may also consist of gelatine.

The following example illustrates a method of operating in conformity with the invention, in which the excipient consists of gelatine.

*Example III.*—10 grammes of gelatine are allowed to swell up in 25 c. c. of distilled water, and the gelatine is dissolved at 50° C.

The following mixture is separately prepared:

| | |
|---|---|
| Alcohol | 80 c. c. |
| Hydrochloric or hydrobromic acid | 1 gr. |
| Triphenylphosphate | 2 gr. |
| Iodoform | 1 gr. |
| Benzoyl peroxide | 0.01 |

Instead of hydrochloric or hydrobromic acid, use may be made of 4 gr. salicylic acid.

To this solution there is added 2 gr. of starch ground up in 10 c. c. of alcohol. One adds this mixture to the gelatine solution maintained at 50° C., while stirring, the operation being performed in a dim light. A small amount of formal or other hardening agents may be added.

As the composition cannot be applied to the base by the spraying process, owing to the great viscosity of the gelatine, one operates preferably by spreading, after heating the resulting emulsion to 30° C.

After exposure of the sensitive layer, it is developed with water, and is then fixed by benzine or by heat. The sensitiveness of this layer is analogous to that of the other layers already mentioned.

In the preceding examples, one may use, as plasticizers, sensitizers and catalysts, substances which are adapted to improve the physical properties of the colloids used as excipient, and/or the sensitiveness of the layers. Among the numerous plasticizers which are suitable for this purpose, one may further mention: butyl phthalate, tartrate or lactate, instead of triphenylphosphate. Also acetamide may be mentioned, which tones the colours to a violet, and the methylcyclohexanone methyladipate.

Among the sensitizers which are not plasticizers, one may mention periodic acid and quinine hydrochloride, which can be added to benzoyl peroxide. The periodic acid can be used for instance in the proportion of 0.5 gr. per litre of the colloidal solution. The quinine hydrochloride is preferably employed in a smaller quantity, for instance less than 1 milligr. per litre of the colloidal solution.

The benzoyl peroxide, which is preferably used at the rate of 0.5 gr. per litre of the colloidal solution, may be replaced by hydrogen dioxide at 100 volumes (0.2 c. c. per litre). These two substances, which cannot be used together, should be applied a short time before use, as the duration of their preservation is limited. However, they cause a great increase in the sensitiveness.

As a catalyst, use may be made of a few drops of hydrochloric acid at 22° B., or hydrobromic or salicylic acid, if necessary, together with the benzoyl peroxide.

According to the invention, the method of applying the compositions may be as follows:

To the base is first applied a layer of varnish containing the halogenated light sensitive substance, then the receptive substance is applied such as starch, and lastly, the whole is covered with a layer of varnish identical with the first layer. In this manner, the receptive substance is held between the two layers of varnish, and it is found that the surface of the product is particularly fine and has a semi-brilliant appearance, which is of interest in the manufacture of photographic papers, for which it will be advantageous to use papers having a coating which contains a pigment, such as the baryta papers, for instance.

Another feature of the present invention consists in covering the sensitive layer with a layer of gelatine or other colloid which is permeable to water, in order to prevent the exit of the halogenated compound by evaporation, but without preventing the penetration of water and other liquids used for the developing and fixing. Any suitable layer or backing may be applied to the back of the base supporting the sensitive layer, in order to prevent any action of the base due to its contact with the sensitive material.

A further feature of the present invention consists in carrying out the fixing by heat, instead of using a solvent of the halogenated compound. A heating in a drying chamber for two hours at 70° C. permits, in fact, of eliminating the washing with a solvent for the iodoform, and such heating increases in general the intensity of the image. This method of fixing is particularly suitable for images upon glass, stoneware, etc., in which the fixing by benzine would cause the loosening and the removal of the plasticizers.

The present invention is applicable to photography, cinematography and photomechanical reproductions.

The light sensitive layers according to the invention may be easily applied to any kind of surface and may be used in numerous industrial applications, such as in cabinet-work, coach and carriage building, furniture, ceramics, articles for offices, toy-trade. Said layers may be used advantageously for ornamental purposes, for reproducing the veins of the wood, marble, laces, etc., and they may be used as coatings for buildings, houses, vehicles, for adorning paper, fabric, receptacles and packing material and any kind of object.

Having now described my invention what I claim as new and desire to secure by Letters Patent is:

1. The method of producing photographic images which comprises exposing to the action of light a sensitive layer comprising a halogen-liberating compound and a polyvinyl compound the color of which is affected by the liberated halogen, developing the layer in an aqueous solution, and fixing the image in a solution of a solvent for the halogen-liberating compound.

2. The method of producing photographic images which comprises exposing to the action of light a sensitive layer comprising a halogen-liberating compound and a water-soluble polyvinyl resin the color of which is affected by the liberated halogen, developing the layer in an aqueous solution, and fixing the image in a solution of a solvent for the halogen-liberating compound.

LOUIS ETIENNE CLÉMENT.